United States Patent [19]
Tidwell

[11] 3,812,926
[45] May 28, 1974

[54] RECREATION VEHICLE
[76] Inventor: Hubert Tidwell, Box 57, Wellington, Utah 84542
[22] Filed: Feb. 1, 1973
[21] Appl. No.: 328,725

[52] U.S. Cl............. 180/9.24, 180/9.38, 280/87.1, 115/1 R, 180/6.24
[51] Int. Cl........................................... B62d 55/02
[58] Field of Search ............ 180/9.24, 9.38, 9.36, 5; 280/87.1, 269

[56] References Cited
UNITED STATES PATENTS
| | | | |
|---|---|---|---|
| 2,218,064 | 10/1940 | Amsbury | 280/87.1 X |
| 2,541,943 | 2/1951 | Sherman | 180/9.38 |
| 2,583,358 | 1/1952 | Cesan | 280/87.1 X |
| D188,204 | 6/1960 | Nash | 280/269 |
| 3,435,907 | 4/1969 | Imhoff | 180/9.38 X |

FOREIGN PATENTS OR APPLICATIONS
314,452   6/1929   Great Britain .................... 180/9.38

Primary Examiner—Richard J. Johnson
Attorney, Agent, or Firm—B. P. Fishburne, Jr.

[57] ABSTRACT

A recreation vehicle for rough terrain cross-country travel by one or two passengers includes a forward tracked pulling unit and a rear wheeled power unit which is steerable from the forward unit. Additional controls on the forward unit effect braking of the rear wheeled unit and raising and lowering of the forward unit to vary the degree of contact of the endless track means with the ground. The vehicle may be converted to water travel and may be used on snow.

8 Claims, 6 Drawing Figures

RECREATION VEHICLE

The objective of the invention is to provide an economical and versatile lightweight vehicle for use by hunters and outdoor enthusiasts during cross-country travel on rough terrain. The vehicle has great climbing ability and is very difficult to upset. It is light enough to be carried by two people and embodies manual carrying aids at its opposite ends. It is highly maneuverable. The vehicle can be quickly converted to water operation with inflatable outrigged pontoons and the traction belt drive will then propel the vehicle in a stream or the like. When not in use, the compact flotation gear may be stored in a compartment of the trailing power unit.

Steering controls for the wheeled power unit and braking controls are conveniently located on the forward traction unit which has a seat for two passengers. Steering and braking are effected by the use of unique foot controls. Lateral tilting for increased stability and raising and lowering of the rear end of the forward traction unit to vary ground contact are accomplished with hand controls on the forward unit.

Other features and advantages of the invention will become apparent during the course of the following description.

BRIEF DESCRIPTION OF DRAWING FIGURES

FIG. 5 is a fragmentary perspective view of foot controls.

FIG. 6 is a plan view of the vehicle rigged for water travel.

DETAILED DESCRIPTION

Figure 1:
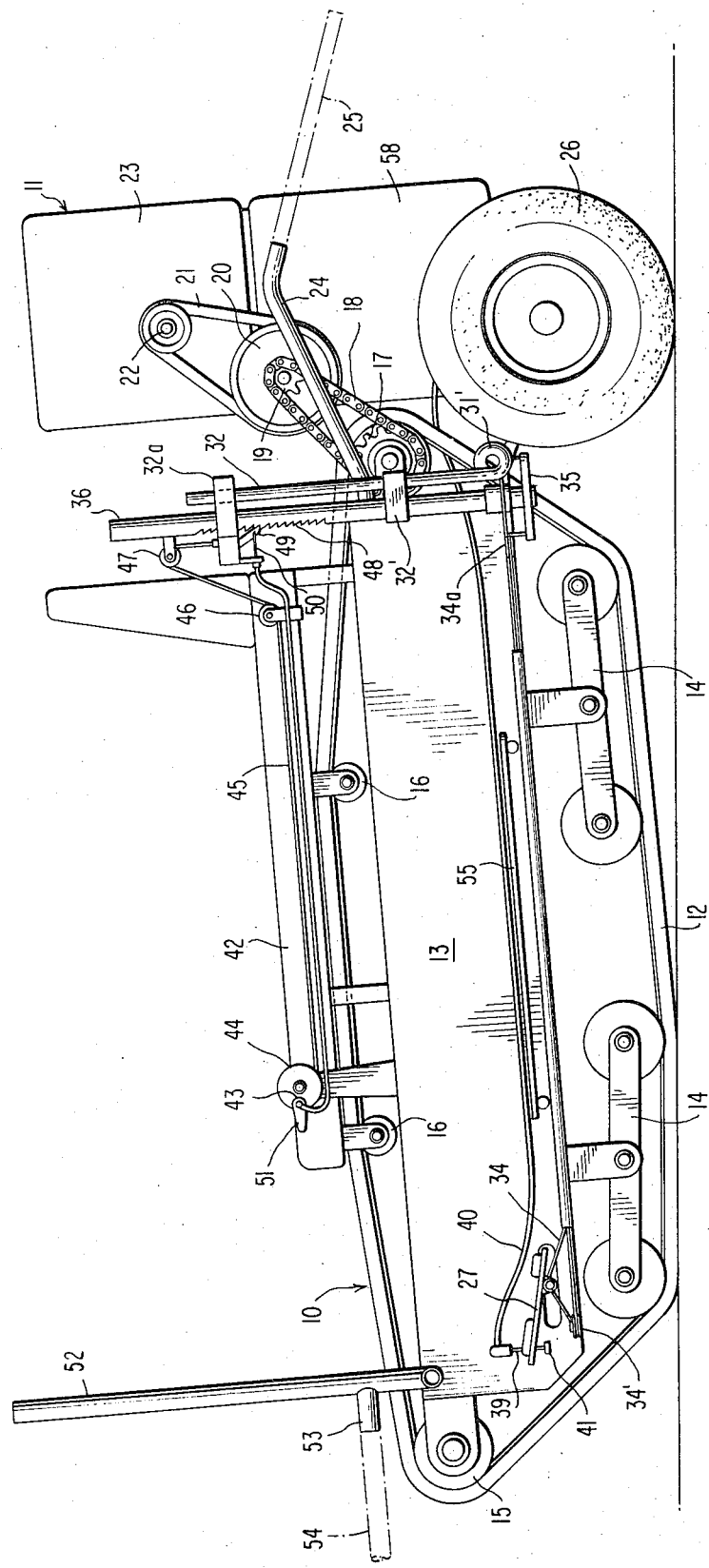
FIG. 1 is a side elevation of a recreation vehicle embodying the invention with the same adjusted for relatively high speed travel on pavement.

Referring to the drawings in detail, the numerals 10 and 11 designate forward traction and rear power units, respectively. The forward traction unit 10 which seats one or two passengers and receives power from the rear unit 11 embodies a divided traction belt 12 suspended from an elongated main frame 13 on lower bogey wheel units 14 and suitably spaced upper guide rollers 15 and 16. Power is delivered to the traction belt 12 by a rear sprocket gear 17 driven by sprocket chain 18 and sprocket gear 19 from a conventional automatic clutch 20 which in turn is driven through a belt 21 from the crank shaft 22 of a small gasoline engine 23, preferably of the type used to power snowmobiles.

Figure 2:
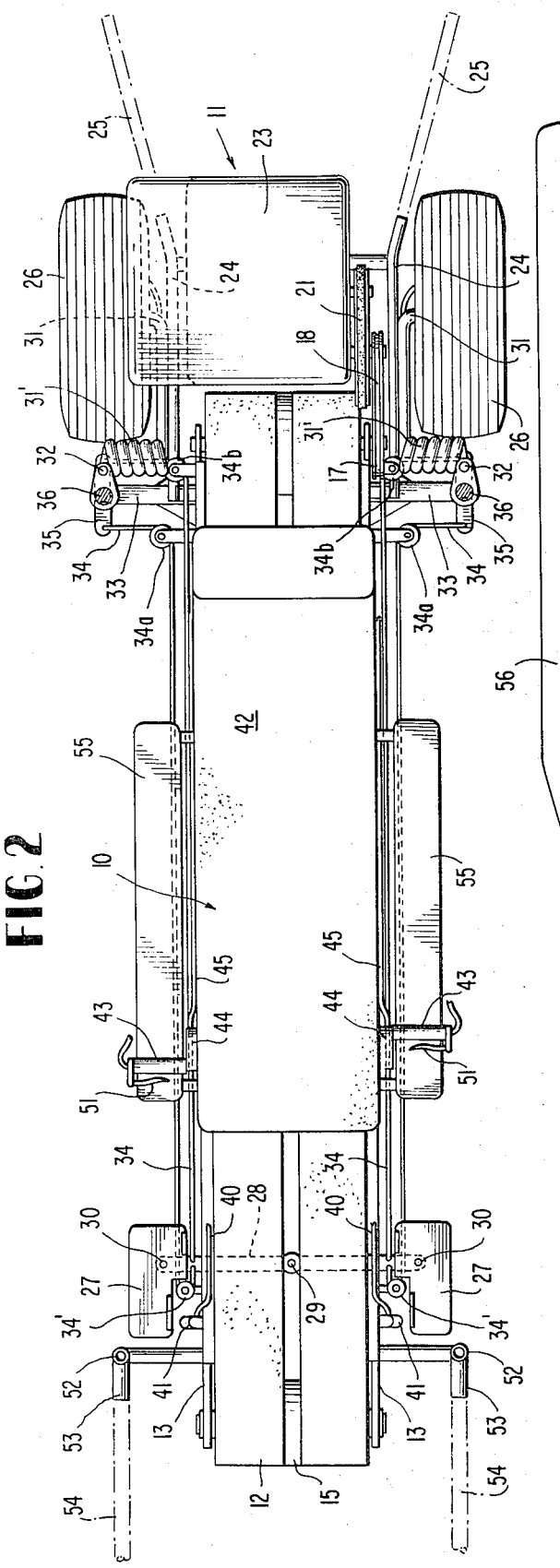
FIG. 2 is a plan view of the vehicle.
Figure 3:
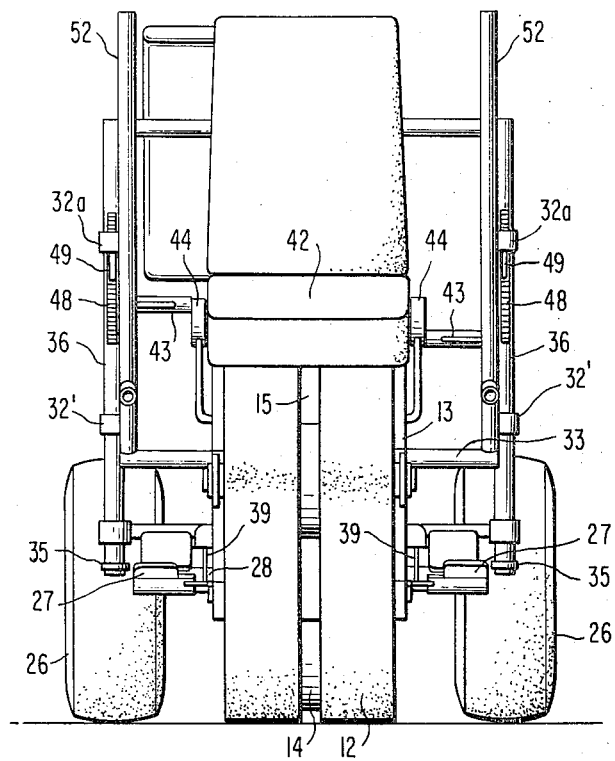
FIG. 3 is a front elevation of the vehicle.
Figure 4:
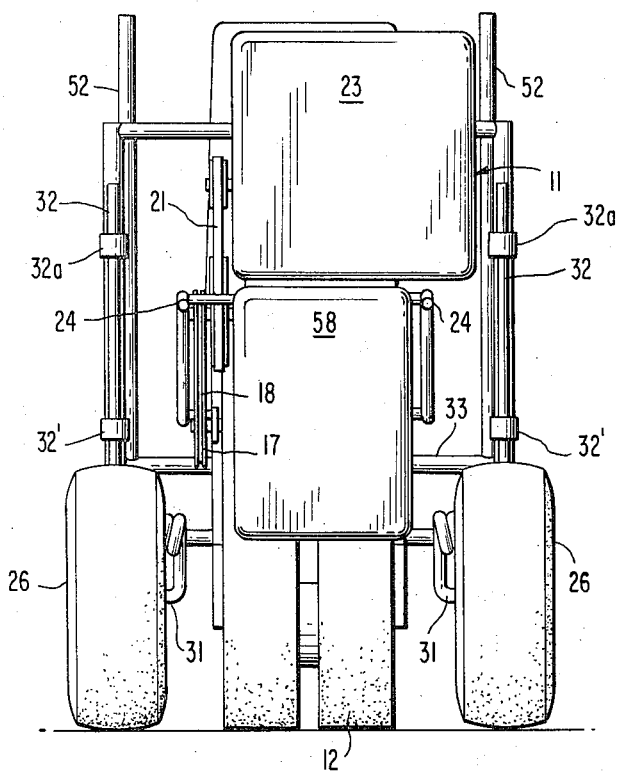
FIG. 4 is a rear elevation.

The weight of the engine 23 and associated parts is partially borne and stabilized by a pair of frame extensions 24 rigid with and projecting rearwardly of the main frame 13. Telescoping handle extensions 25, FIGS. 1 and 2, are provided for manually carrying the rear end of the vehicle over ditches and the like and these handles are readily detachable from the frame extensions 24.

The rear power unit 11 is further supported by a pair of caster wheels 26 on the opposite sides thereof and these wheels are positioned substantially outwardly of the opposite sides of the slender forward unit 10 adjacent the rear end thereof for maximum stability.

Steering and braking controls for the rear power unit 11 are provided near the leading end of forward unit 10 in the form of foot pedals 27 mounted on a swingable crossbar 28 which is pivoted at 29 to the frame of the unit 20. The pedals 27 are further pivoted to the ends of the crossbar 28 at 30 for independent turning inwardly and outwardly and the foot pedals are further pivoted at 28' to the ends of crossbar 28 for independent vertical swinging movement in connection with the braking operation, to be further described. The various movements of the foot pedal means to effect steering and braking of the vehicle are shown by the arrows in FIG. 5.

Further in connection with steering and braking, the wheels 26 are mounted on axle members 31 having integral coil springs 31' and upstanding pivot shaft extensions 32 supported in bearing means 32' and 32a. The two caster wheels 26 are adapted to turn or pivot in unison on the axes of the shafts 32. To effect such pivoting, for the purpose of steering the vehicle, a pair of steering cables 34 have their ends attached to the swingable crossbar 28 and are engaged with fixed forward guide sheaves 34' and rearward guide sheaves 34a and 34b suitably attached to the forward unit 10. After passing around the sheaves 34a and 34b, the cable 34 is connected with the steering arms 35 secured to the lower ends of upright steering shafts 36 which are also supported in the spaced bearings 32' and 32a. Consequently, swinging of the foot pedal operated crossbar 28 on its pivot 29 will effect simultaneous steering of the two caster wheels 26 through the operation of steering cables 34, arms 35 and associated elements.

The wheels 26 are equipped with conventional brake assemblies, not shown, and these are independently actuated through cables 39 extending through guide tubes 40 along the opposite sides of the vehicle. To apply either brake independently, the selected pedal 27 is first tilted rearwardly on its pivot 28' and then towed inwardly on its pivot 30 and depressed downwardly on the pivot 28' when its toe portion is directly over a brake cable actuator element 41. Pushing of this element downwardly by means of the foot pedal 27 will tension the brake cable 39 and activate the brake mechanism of the particular wheel 26. When the element 41 is released by the pedal, the brake mechanism is deactivated by conventional spring means. Steering is also achieved by the application of one wheel brake while the brake of the other wheel is released. It may now be seen that the vehicle steering and braking is attained by the operation of the foot pedal means on the forward unit 10.

Additional means is provided to raise and lower the rear end of forward unit 10 to vary the amount of ground contact for the traction belt 12. With the rear end of the unit 10 elevated as in FIG. 1, only a small stretch of the belt 12 engages the ground and this condition prevails during movement at relatively high speeds over pavement. On rough terrain and over fields of grass and the like, the unit 10 is lowered to achieve maximum traction at slower speeds.

To accomplish this, a pair of hand cranks 43 are provided on opposite sides of passenger seat 42 and near the forward end of this seat. These hand cranks are independently operable with wind-up spools 44 to reel in or pay out lift cables 45 on opposite sides of the vehicle which engage fixed sheaves 46 and additional sheaves 47 of the lift assemblies. The shafts 36 are equipped on their forward sides with ratchet teeth 48 releasably engaged by pawls 49 having independent cable operators 50, under control of levers 51 on the hand cranks 43. By this arrangement, one or both wheels 26 may be raised or lowered relative to the rear end of the forward unit 10 to adjust the degree of contact of the traction belt 12 with the ground or to tilt the unit 10 laterally in either direction so as to aid in negotiating sharp turns without upsetting.

At the forward end of the vehicle, upstanding brush bars 52 are provided to brush aside hanging limbs and the like to protect the riders from being struck by the same. Near the bottoms of these brush bars 52, socket extensions 53 are provided for detachable telescoping lifting handles 54 which facilitate carrying the forward end of the vehicle over ditches and the like. Two riders utilizing the temporary handles 25 and 54 may easily carry the relatively light vehicle.

Additional foot rests 55 for riders may be provided on the unit 10 below the seat 42.

FIG. 6 illustrates how the vehicle may be equipped readily with inflatable removable outrigger pontoons 56 which are detachably secured by arms 57 to the frame 13 of forward unit 10. When removed and deflated, this flotation gear is stored out of the way in a storage compartment 58 of rear power unit 11 disposed below the engine 23.

It is thus seen that the invention provides a rough terrain or cross-country recreational vehicle which may also travel on a paved highway or on water. It is thought to be ideal for use by hunters and by those interested in cross-country sightseeing or exploring. The vehicle features climbing ability due to its track-laying forward pulling unit 10 and, as explained, the degree of traction may be varied. Traction power is furnished by the rear unit 11 and the two caster wheels 26 of this unit are steerable and may be braked independently, as previously described. The vehicle is dependable, economical to operate, lightweight and very rugged and durable. It is also very safe.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A recreational vehicle comprising a forward traction unit having a passenger seat and an endless traction belt, a rear power unit immediately behind the forward traction unit and having a pair of caster wheels, power transmission means coupled between said power and traction units and delivering power to said traction belt, passenger operated foot control means on said forward traction unit coupled with said caster wheels to brake and steer the same, and additional control means on said forward traction unit to raise and lower the rear end of such unit relative to the wheels of said rear power unit so that the degree of contact of said traction belt with the ground may be varied.

2. The structure of claim 1, and said passenger operated foot control means includes a transversely extending horizontally swingable crossbar on said forward unit, a pair of foot pedals independently mounted on said crossbar and being pivotal about the axis of the crossbar and also being pivotal in planes parallel to said axis, brake actuator cable means on the forward unit in the path of movement of said foot pedals, and steering cable means for said caster wheels connected with said swingable crossbar near the opposite ends thereof.

3. The structure of claim 1, and said additional control means including lifting cable means on said forward unit having a connection with a rear lifting structure, and passenger operated lifting cable wind-up means on the forward unit to facilitate raising or lowering selectively either wheel of said rear power unit relative to the rear end of said forward unit.

4. The structure of claim 1, and said forward traction unit comprising a transversely narrow elongated unit adapted to be straddled by the legs of riders, said caster wheels of the rear power unit being separated by a distance substantially wider than the width of the forward traction unit.

5. The structure of claim 4, and said rear power unit comprising an engine, gearing interconnecting the crank shaft of said engine with a rotational drive shaft for said belt, and spring support means for said caster wheels of the rear power unit and being secured to and supported by framework of the forward traction unit.

6. The structure of claim 1, and lifting handle extensions for said vehicle detachably coupled therewith near the forward and rear ends thereof to enable two passengers to bodily carry said vehicle across ditches and the like.

7. The structure of claim 6, and upstanding frame means near the forward end of said forward traction unit to remove hanging branches and the like from the path of movement of the vehicle for the protection of passengers on the vehicle.

8. The structure of claim 1, and inflatable detachable outrigger pontoons for said vehicle connected with the forward traction unit, and a storage chamber for said pontoons on said rear power unit.

* * * * *